(12) United States Patent
 Killing et al.

(10) Patent No.: US 10,640,168 B2
(45) Date of Patent: *May 5, 2020

(54) SPLIT HANDLEBAR FOR A BICYCLE

(71) Applicant: VROOMEN-WHITE DESIGN INC., Toronto (CA)

(72) Inventors: David Killing, Scarborough (CA); Robert Pike, Caesarea (CA); Richard Matthews, Peterborough (CA)

(73) Assignee: VROOMEN-WHITE DESIGN INC. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/336,848

(22) PCT Filed: Sep. 26, 2017

(86) PCT No.: PCT/CA2017/051132
§ 371 (c)(1),
(2) Date: Mar. 26, 2019

(87) PCT Pub. No.: WO2018/053651
PCT Pub. Date: Mar. 29, 2018

(65) Prior Publication Data
US 2019/0359281 A1 Nov. 28, 2019

Related U.S. Application Data

(60) Provisional application No. 62/400,043, filed on Sep. 26, 2016.

(51) Int. Cl.
*B62K 21/06* (2006.01)
*B62K 15/00* (2006.01)
(Continued)

(52) U.S. Cl.
CPC .............. *B62K 21/24* (2013.01); *B62K 15/00* (2013.01); *B62K 21/12* (2013.01); *B62K 21/16* (2013.01); *B62K 2015/001* (2013.01)

(58) Field of Classification Search
CPC ........ B62K 21/24; B62K 15/00; B62K 21/16; B62K 2015/001
See application file for complete search history.

(56) References Cited

U.S. PATENT DOCUMENTS

| 781,128 A | 1/1905 | Calkins et al. |
|---|---|---|
| 4,384,497 A | 5/1983 | Gatsos |
| (Continued) | | |

FOREIGN PATENT DOCUMENTS

| CN | 100408421 C | 8/2008 |
|---|---|---|
| GB | 2376927 B | 5/2004 |

OTHER PUBLICATIONS

Canadian Intellectual Property Office, International Search Report and Written Opinion of the International Searching Authority, in PCT/CA2017/051132, dated Jan. 15, 2018, which is the international application to this U.S. application.

*Primary Examiner* — Tony H Winner
(74) *Attorney, Agent, or Firm* — Kolitch Romano LLP

(57) ABSTRACT

A split handlebar assembly for an aerodynamic bicycle having a handlebar stem for attaching said split handlebar assembly, comprising a right handlebar and a left handlebar; the right handlebar having a mounting section at one end, and a right grip section at the other end; the left handlebar having a mounting section at one end, and a left grip section at the other end; the right handlebar mounting section being configured to engage with the left handlebar mounting section; and the engaged mounting sections being configured to secure the right handlebar and the left handlebar to the handlebar stem.

20 Claims, 9 Drawing Sheets

(51) Int. Cl.
   *B62K 21/12* (2006.01)
   *B62K 21/24* (2006.01)
   *B62K 21/16* (2006.01)

(56) References Cited

U.S. PATENT DOCUMENTS

| | | |
|---|---|---|
| 4,682,509 A | 7/1987 | Takamiya et al. |
| 4,966,047 A | 10/1990 | Krauer et al. |
| 5,456,481 A | 10/1995 | Allsop |
| 5,555,775 A | 9/1996 | D'Aluisio et al. |
| 6,017,048 A | 1/2000 | Fritschen |
| 8,307,736 B2 | 11/2012 | Lin |
| 8,661,935 B2 | 3/2014 | Cote et al. |
| 8,739,653 B2 | 6/2014 | Hissam |
| 2015/0296907 A1 | 10/2015 | Henderson |
| 2016/0016630 A1 | 1/2016 | Thompson |

SPLIT HANDLEBAR FOR A BICYCLE

FIELD OF THE INVENTION

The present invention relates to bicycles and more particularly, to a split handlebar suitable for a bicycle.

BACKGROUND OF THE INVENTION

In the art, aerodynamically designed bicycles are commonplace at triathlon events. Triathlons are held on every continent throughout the year. As triathlons continue to grow in popularity both professional athletes and non-professional athletes, commonly referred to as age group athletes or "age groupers" are travelling, often by air, to race in events. As most athletes prefer having their own race gear, bikes are transported to these race venues. Packing a bike for transport often involves at least partial disassembly of the bike including the handlebar and aerobar assembly due to size and/or shape of the handlebar components. Upon arrival, the bike and components must be reassembled. The disassembly and reassembly is often non-trivial and often on-site bike mechanical support may be required. For the average age grouper this becomes a stressor and additional time consuming pre-race activity.

Accordingly, there remains a need for improvements in the art.

BRIEF SUMMARY OF THE INVENTION

The present invention is directed to a split handlebar suitable for use with an aerodynamic bicycle or aero bike.

According to one aspect, the present invention comprises a split handlebar assembly for an aerodynamic bicycle having a handlebar stem for attaching said split handlebar assembly, comprising a right handlebar and a left handlebar; the right handlebar having a mounting section at one end, and a right grip section at the other end; the left handlebar having a mounting section at one end, and a left grip section at the other end; the right handlebar mounting section being configured to engage with the left handlebar mounting section; and the engaged mounting sections being configured to secure the right handlebar and the left handlebar to the handlebar stem.

According to another aspect, the present invention comprises a bicycle frame comprising: a fork assembly; a bottom bracket; a top tube, a head tube, and a down tube; one end of the top tube and one end of the down tube being affixed to the head tube, and another end of the top tube being affixed to a seat tube; first and second chain stays, and one end of each of the chain stays being affixed to the bottom bracket; the fork assembly being operatively coupled to the head tube; and a split handlebar assembly comprising, a right handlebar and a left handlebar; the right handlebar having a mounting section at one end, and a right grip section at the other end; the left handlebar having a mounting section at one end, and a left grip section at the other end; the right handlebar mounting section being configured to engage with the left handlebar mounting section; and the engaged mounting sections being configured to secure the right handlebar and the left handlebar to the handle bar stem to form a handlebar assembly.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which.

Like reference numerals indicate like or corresponding elements or components in the drawings.

DETAILED DESCRIPTION OF THE EMBODIMENTS OF THE INVENTION

Figure 1:
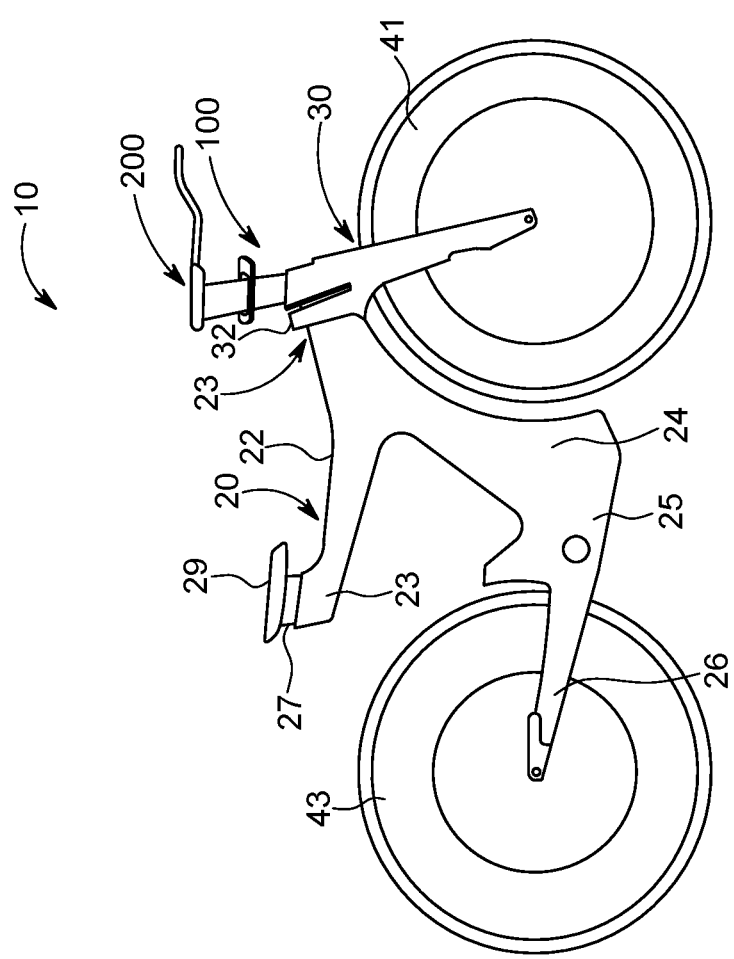
FIG. 1 shows in diagrammatic form an aerodynamic bicycle with a split handlebar assembly according to an embodiment of the present invention.

Reference is first made to FIG. 1, which shows in diagrammatic form an aerodynamic bicycle, i.e. an aero bike, with a split handlebar assembly according to an embodiment of the present invention. The aerodynamic bicycle is indicated generally by reference 10 and the split handlebar assembly is indicated generally by reference 100.

As shown in FIG. 1, the aero bike 10 comprises a frame or frameset 20, a fork assembly 30 and front 41 and rear 43 wheels. According to an exemplary embodiment, the frame 20 comprises a "beam configuration" as will be understood by those skilled in the art. The frame 20 comprises a top tube 22, a bottom tube 24, a bottom bracket 25, chain stays 26 (only the right chain stay being shown in FIG. 1). According to an exemplary embodiment, the frame 20 comprises an external steerer configuration with a head tube 32 for coupling the fork assembly 30 to the frame 20, and separate steerer tube 34 in the fork assembly for mounting an aerobar assembly, indicated generally by reference 200, above the split handlebar assembly 100.

Figure 3:
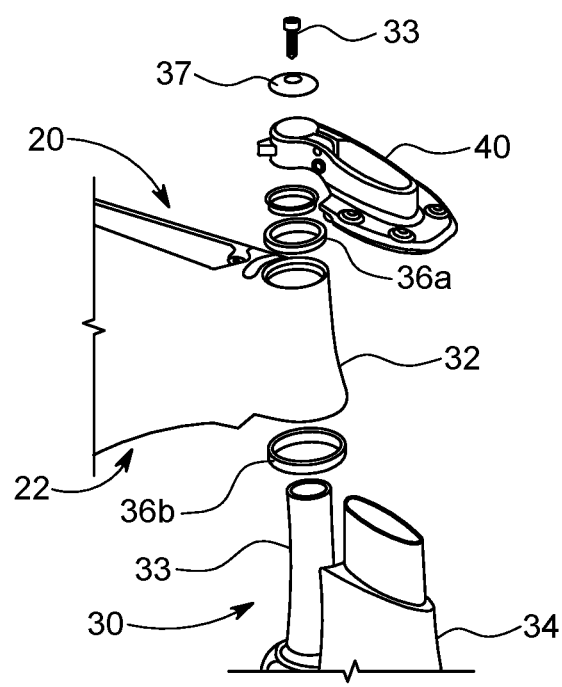
FIG. 3 is an exploded view of a fork assembly with an external steerer configuration for the bicycle of FIG. 1.

As shown in FIG. 3, the fork assembly 30 includes a fork steerer 33, which is configured to fit inside the head tube 32 and couple the fork assembly 30 to the frame 20 in a steerable configuration. As shown, the fork assembly 30 also includes an external steerer indicated by reference 34. The fork steerer 33 (and upper headset 36a and lower headset 36b bearings) and the external steerer 34 are coupled or attached to the frame 20 by a stem plate indicated by reference 40. The fork steerer 33 and headset bearings 36a and 36b are secured to the head tube 32 and frame 20 by a stem cap 37 and a stem cap bolt 38, in known manner.

Referring back to FIG. 1, the top tube 22 includes a seat post section 28 and adjustable seat post 27 for mounting a saddle indicated by reference 29. According to another aspect, the front 41 and 43 wheels comprise aerodynamic wheels with a deep flange or full disc configuration. The specific implementation and/or assembly details and additional components required for setting up the bicycle 10 and/or frameset 20 will be readily apparent to those skilled in the art.

Figure 2:
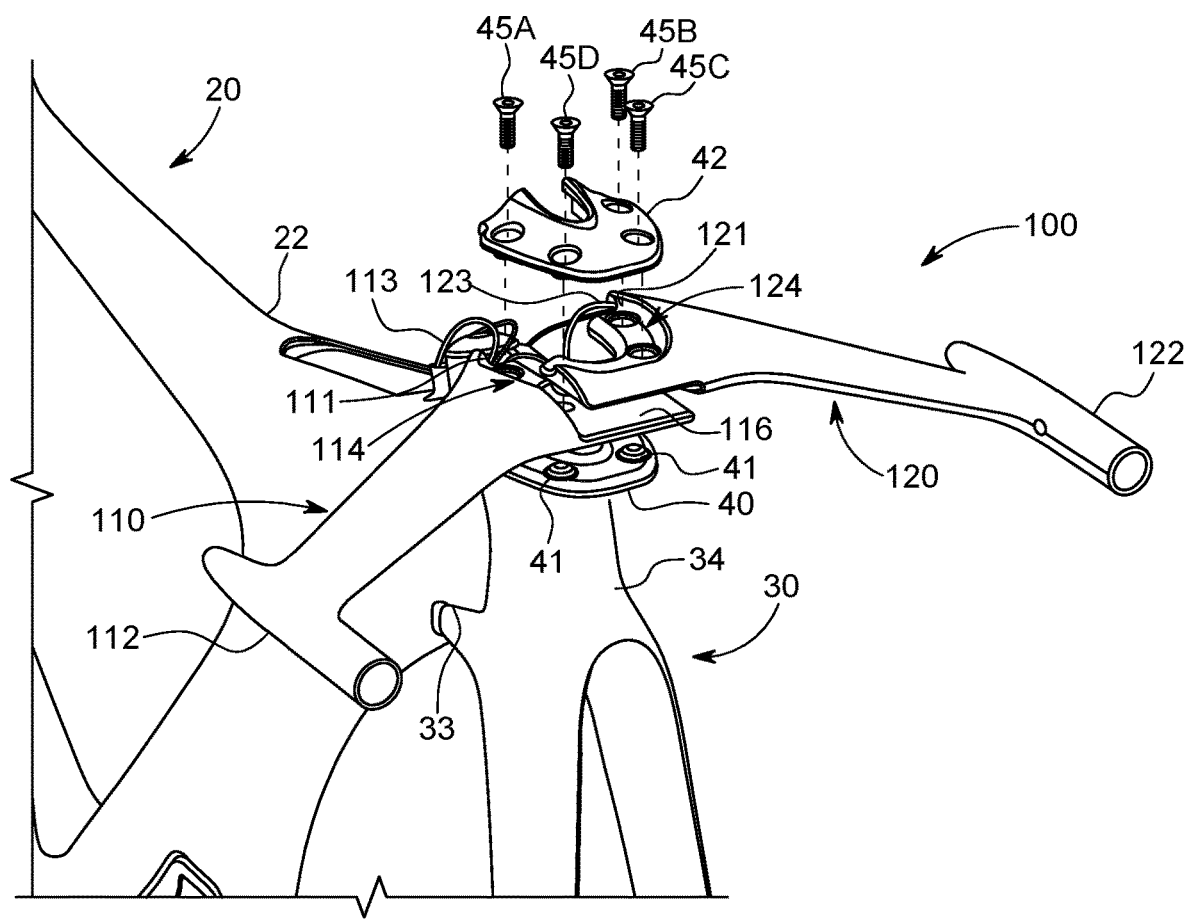
FIG. 2 is a view of the split handlebar assembly of FIG. 1 according to an embodiment of the present invention.
Figure 5:
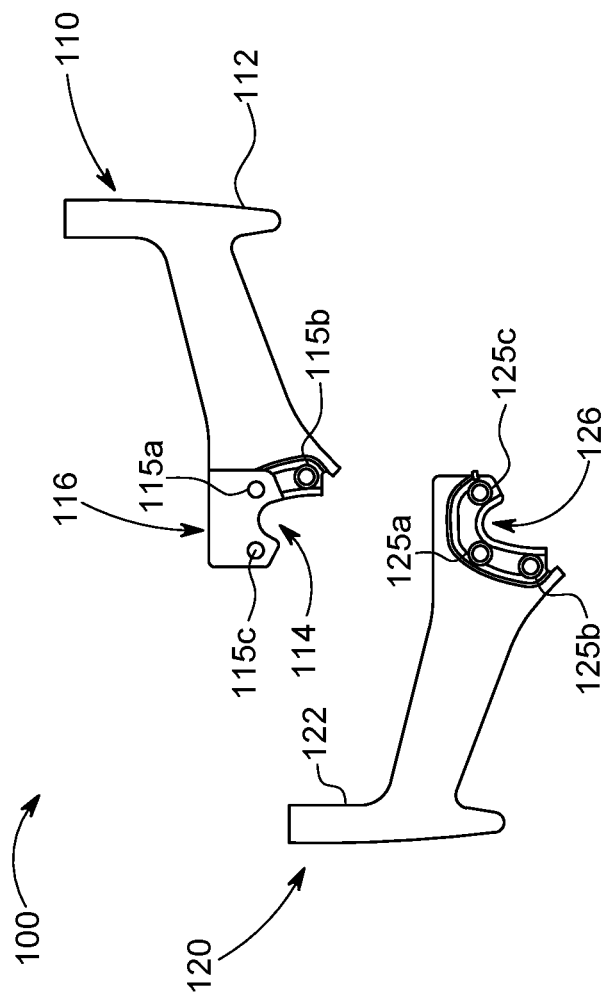
FIG. 5 shows the right handlebar section and the left handlebar section of the split handlebar assembly of FIG. 2.
Figure 6A:
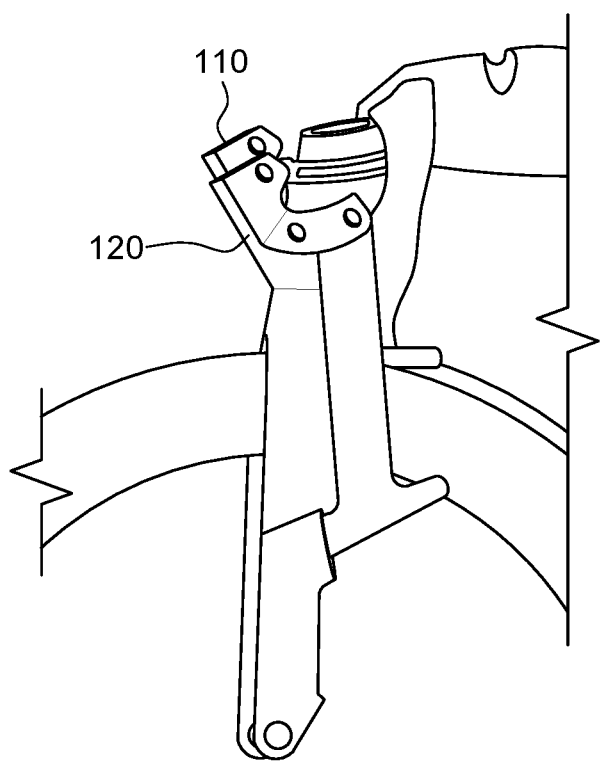
FIG. 6A shows a side-view of a bicycle with the split handle bar assembly in a disassembled or travel configuration for packing the bicycle for transport according to an embodiment of the present invention.
Figure 6B:
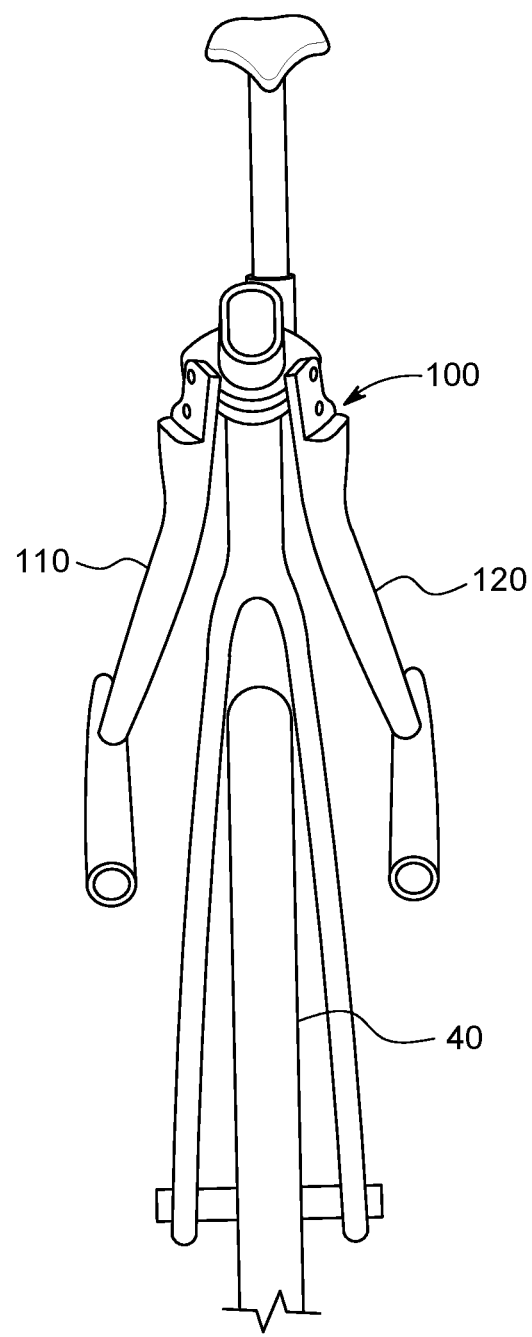
FIG. 6B shows a front view of the bicycle with the split handle bar assembly in a disassembled or travel configuration according to an embodiment of the present invention.
Figure 6C:
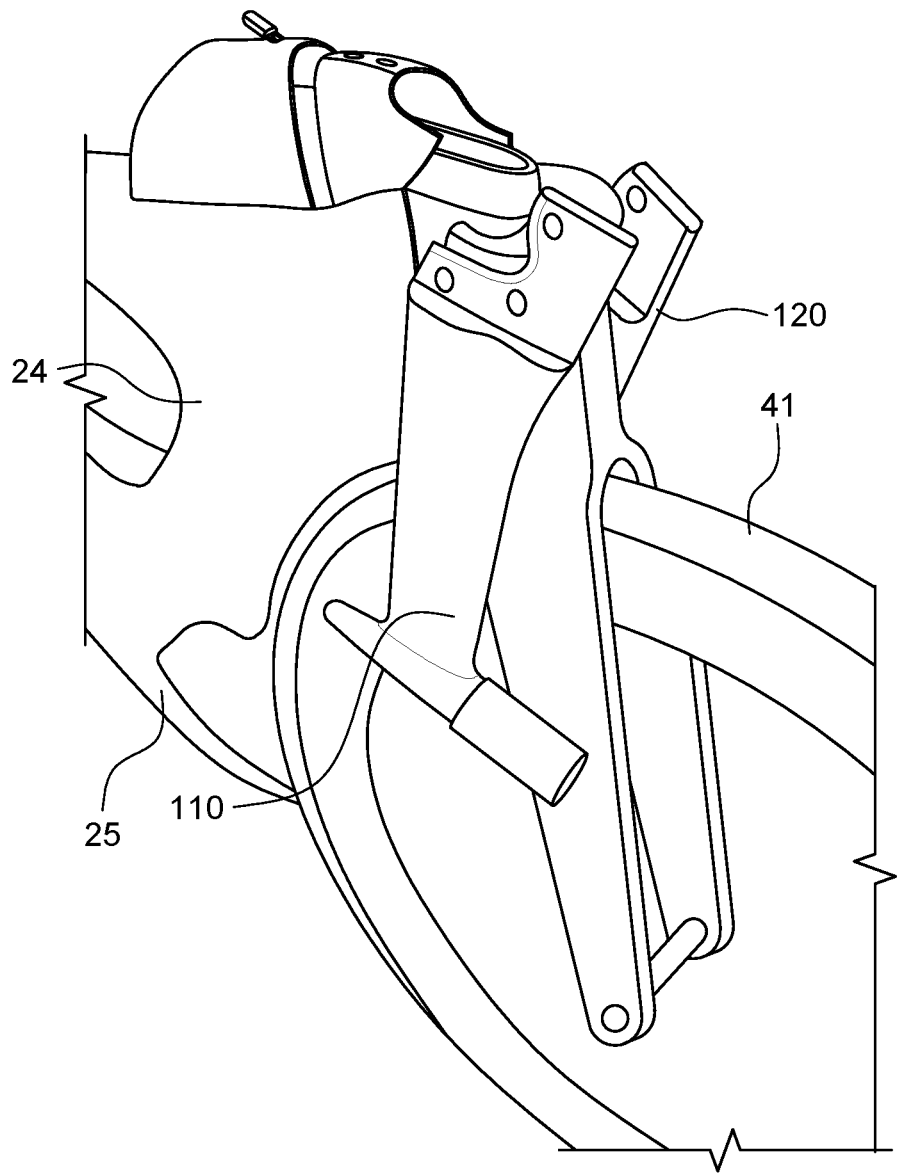
FIG. 6C shows a right-side view of the bicycle with the split handle bar assembly in a disassembled or take-down configuration according to an embodiment of the present invention.
Figure 6D:
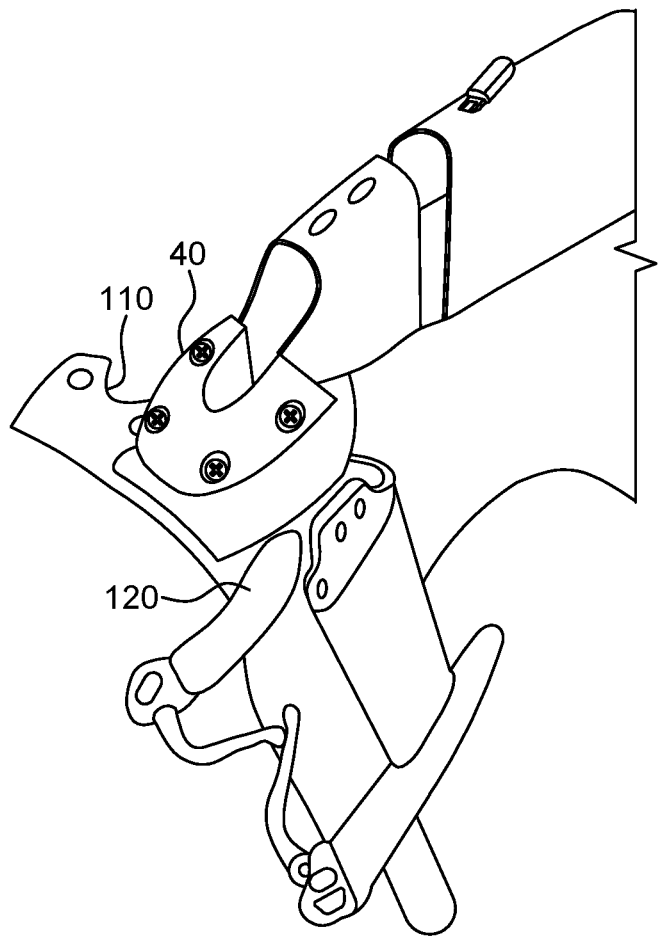
FIG. 6D shows top view of the bicycle with the split handle bar assembly in a disassembled or travel configuration for packing the bicycle for transport according to an embodiment of the present invention.

Reference is next to made to FIGS. 2 and 5, which shows the split handlebar assembly 100 according an embodiment of the present invention in more detail. The split handlebar assembly 100 comprises a right handlebar section indicated by reference 110 and a left handlebar section indicated by reference 120. The right handlebar section 110 includes a right hand grip 112 formed or attached to one end of the handlebar section 110 as shown. The right handlebar section 110 also includes a mounting section or plate at the other end and indicated generally by reference 114. According to an exemplary implementation, the mounting section 114 includes first 115a, second 115b and third 115c mounting holes. Similarly, the left handle section 120 includes a left hand grip 122 formed or attached to one end of the left handlebar section 120 as shown. The left handlebar section 120 also includes a mounting section or plate at the other end and indicated generally by reference 124. According to an exemplary implementation, the left mounting section 124 includes first 125a, second 125b and third 125c mounting holes.

Figure 4A:
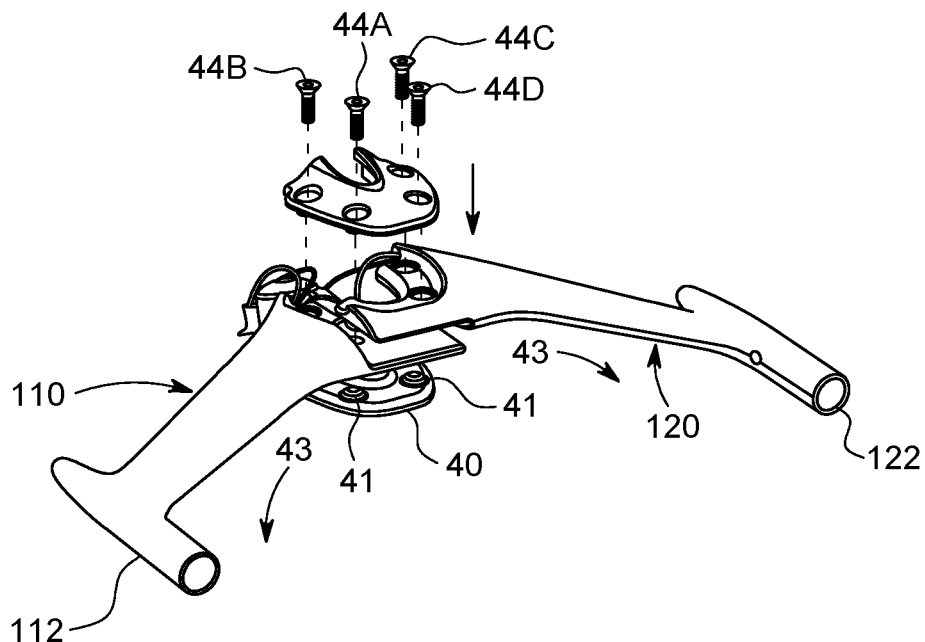
FIG. 4A is a view of the split handlebar assembly in a "bars down" position according to an embodiment of the present invention.

Referring still to FIGS. 2 and 5, the right mounting section or plate 114 includes an overlapping section indicated generally by reference 116. Similarly, the left mounting section or plate 124 includes an overlapping section indicated by reference 126. According to an embodiment as shown in FIG. 2, the right handlebar section 110 is mounted directly on the stem plate 40. The left handlebar section 120 is then mounted on top of the right handlebar section 110 as shown in FIG. 2 and also in FIG. 4A. The handlebar sections 110 and 120 are held in place by a base plate cover indicated generally by reference 42 and securely attached to the fork assembly 30 (i.e. the external steerer 34) by mechanical fasteners 44, e.g. M5 hex cap screws, indicated individually by references 44a, 44b, 44c and 44d. The M5 screws pass through the respective mounting holes 125 (FIG. 5), indicated individually by references 125a, 125b, 125c and 125d, in the left handlebar section 120 and the respective mounting holes 115 (FIG. 5) in the right handlebar section 110 and are securely tightened into respective threaded sockets or holes 41, indicated individually by references 41a, 41b, 41c and 41d, in the stem plate 40. The configuration depicted in FIGS. 2 and 4A comprises a "bars down" position with the right 110 and left 120 handlebar sections oriented in a downward direction as shown and indicated by arrows 43.

Figure 4B:
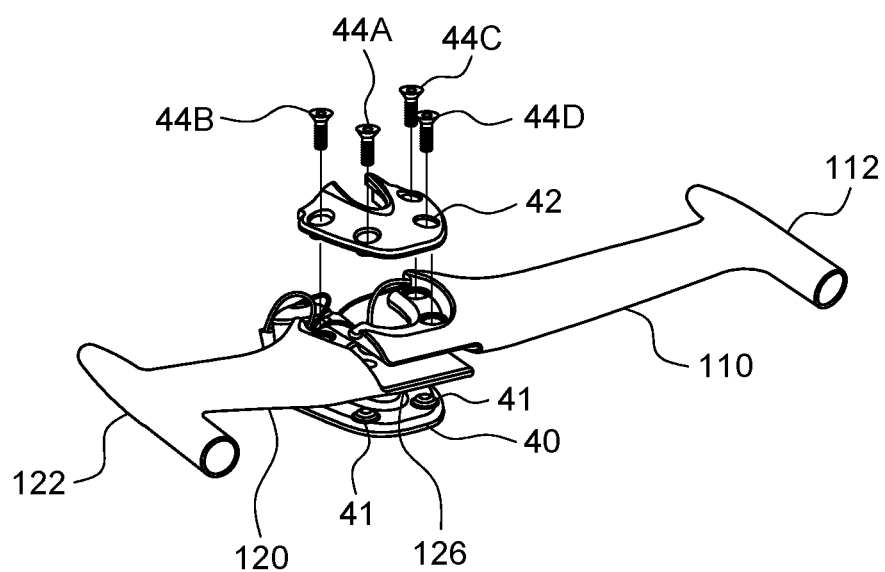
FIG. 4B is a view of the split handlebar assembly in a "bars up" position according to an embodiment of the present invention.

According to embodiment, the mounting section or plate 114 for the right handlebar 110 and the mounting section or plate 124 for the left handlebar 120 are configured to overlap to improve the structural integrity or strength of the assembled split handlebar assembly 100. According to an exemplary implementation, one or more of the mounting holes 115a and/or 115c in the mounting plate 114 are configured to align with one or more of the mounting holes 125 and/or 125c in the mounting plate 124 of the left hand handlebar when the respective handlebar sections 110 and 120 are stacked for assembly on the stem plate 40 (FIG. 2), for example, as depicted in FIGS. 4B and 5. It will be appreciated that the overlap of the mounting plates 114 and 124 and the installation/tightening of the base plate cover 42 with the bolt fasteners 44a, 44b, 44c and 44d into the stem plate 40 provides a structural sandwich or layer configuration which improves the structural integrity of the handlebar assembly 100.

According to another embodiment, the right 110 and left 120 handlebar sections are also configurable in a "bars up" position as shown in FIG. 4B. In the bars up configuration, the left handlebar section 120 is flipped over and mounted first directly on the stem plate 40 as shown in FIG. 4B. The right handlebar section 110 is also flipped over and mounted on top of the left handlebar section 120 as also shown in FIG. 4B. The left 120 and right 110 handlebar sections are then secured to the stem plate 40 with the base plate 42 and the fasteners 44 tightened into the corresponding screw sockets 41, indicated individually by references 41a, 41d (as visible in FIG. 4B), on the stem plate 40 in a manner similar to that described above. In the bars up position, the left handlebar section 120 provides the right side grip indicated by reference 121 and the right handlebar section 110 provides the left side grip indicated by reference 111. It will be appreciated that the brake control cables and/or shifter control cables may also need to be re-routed and/or re-connected to maintain consistency of the controls in the cockpit formed by the handlebar assembly 100.

Referring to FIG. 2, the mounting section 124 of the left handlebar section 120 overlaps the mounting section 114 of the right handlebar section 110 in the section or area indicated by reference 118. This overlap provides a stronger structural connection between the handlebar sections 110 and 120 and the stem plate 40. Similarly, in the "bars up" position shown in FIG. 4B, the mounting section 114 of the right handlebar section 110 overlaps the mounting section of the left handlebar section 120 in the section or area indicated by reference 119. This overlap provides a stronger structural connection between the handlebar sections 110 and 120 and the stem plate 40, for example, to withstand downward pressure or forces applied by the rider to the right 112 and/or left 122 grips. The structural connection may be further strengthened with the overlapping mounting sections 114 and 124, as described above.

As also shown in FIG. 2, the right handlebar section 110 includes a conduit or internal tube 111 for routing bicycle component cables, for example, a rear brake cable and/or derailleur shifters, indicated generally by reference 113. Similarly, the left handlebar section 120 includes a conduit or internal tube 121 for routing bicycle component cables accessible at the left grip 122, for example, a front brake cable and/or derailleur shifters, indicated by reference 123, which are coupled to a brake lever and shifter buttons, respectively, mounted on the left grip 122.

According to another aspect, the right handlebar section 110 and/or the left handlebar section 120 can be disengaged from the stem plate 40 for packing the bicycle 20 in a bike travel case. The fasteners 44 are unscrewed and the base plate 42 is removed. The right handlebar 110 and the left handlebar 120 sections are allowed to hang vertically with the cables remaining connected, for example, as shown in FIGS. 6A to 6D.

It will be appreciated that the capability to disengage the right 110 and left 120 handlebar sections for packing and/or shipping is particularly advantageous for a bike setup comprising hydraulic braking systems with hydraulic fluid filled cables that are not particularly well suited to be disconnected and reconnected, and/or cables that are not easily routed or reconnected.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A split handlebar assembly for an aerodynamic bicycle, comprising:
   a right handlebar and a left handlebar;
   said right handlebar having a mounting section at one end, and a right grip section at the other end;
   said left handlebar having a mounting section at one end, and a left grip section at the other end;
   said right handlebar mounting section being configured to engage with said left handlebar mounting section to form a half lap splice joint; and
   said engaged mounting sections being configured to secure said right handlebar to said left handlebar.

2. The split handlebar assembly as claimed in claim 1, wherein said mounting section for said right handlebar comprises a mounting plate having one or more mounting holes, and said mounting section for said left handlebar comprises a mounting plate having one or more mounting holes, and said mounting holes being configured to align with mounting sockets in a stem plate secured to a handlebar stem.

3. The split handlebar assembly as claimed in claim 2, wherein one or more of said mounting holes in said right handlebar are configured to align with one or more of said mounting holes in said left handlebar when positioned in a mounting position on the stem plate.

4. The split handlebar assembly as claimed in claim 3, further comprising a base plate cover configured to secure the left handlebar and right handlebar to the handlebar stem.

5. The split handlebar assembly as claimed in claim 1, wherein said right handlebar includes a conduit for running a bicycle component cable, and said left handlebar includes a conduit for running a bicycle component cable, and said cables are configured to keep said right handlebar and said left handlebar attached to the bicycle when detached from the handlebar stem.

6. The split handlebar assembly as claimed in claim 1, wherein said right handlebar is configured to be mounted to the handlebar stem in a flipped over position, and said left handlebar is configured to be mounted to the handlebar stem in a flipped over position, and in said flipped over position, said right handlebar and said left handlebar forming a bars up setup.

7. The split handlebar assembly as claimed in claim 6, wherein said mounting section for said right handlebar comprises a mounting plate having one or more mounting holes, and said mounting section for said left handlebar comprises a mounting plate having one or more mounting holes, and said mounting holes being configured to align with mounting sockets in a stem plate secured to the handlebar stem with a base plate cover.

8. The split handlebar assembly as claimed in claim 7, wherein one or more of said mounting holes in said right handlebar are configured to align with one or more of said mounting holes in said left handlebar when positioned in a mounting position on the stem plate, so that said mounting section of said right handlebar overlaps at least a portion of said mounting section of said left handlebar.

9. A bicycle frame comprising:
   a fork assembly;
   a bottom bracket;
   a top tube, a head tube, and a down tube;
   one end of the top tube and one end of the down tube being affixed to the head tube, and another end of the top tube being affixed to a seat tube;
   first and second chain stays, and one end of each of the chain stays being affixed to the bottom bracket; and
   a split handlebar assembly comprising:
      a right handlebar and a left handlebar;
      said right handlebar having a mounting section at one end;
      said left handlebar having a mounting section at one end;
      said right handlebar mounting section being configured to overlap and engage with said left handlebar mounting section to form a half lap splice joint; and
      said engaged mounting sections being configured to secure said right handlebar to said left handlebar to form a handlebar assembly operatively attachable to the fork assembly.

10. The bicycle frame as claimed in claim 9, wherein said mounting section for said right handlebar comprises a mounting plate having one or more mounting holes, and said mounting section for said left handlebar comprises a mounting plate having one or more mounting holes, and said mounting holes being configured to align with mounting sockets in a stem plate.

11. The bicycle frame as claimed in claim 10, wherein one or more of said mounting holes in said right handlebar are configured to align with one or more of said mounting holes in said left handlebar when positioned in a mounting position on the stem plate.

12. The bicycle frame as claimed in claim 9, wherein said right handlebar is configured to be mounted to a handlebar stem in a flipped over position, and said left handlebar is configured to be mounted to the handlebar stem in a flipped over position, and in said flipped over position, said right handlebar and said left handlebar forming a bars up setup.

13. The bicycle frame as claimed in claim 12, wherein said mounting section for said right handlebar comprises a mounting plate having one or more mounting holes, and said mounting section for said left handlebar comprises a mounting plate having one or more mounting holes, and said mounting holes being configured to align with mounting sockets in a stem plate secured to the handlebar stem with a base plate cover.

14. The bicycle frame as claimed in claim 13, wherein one or more of said mounting holes in said right handlebar are configured to align with one or more of said mounting holes in said left handlebar when positioned in a mounting position on the stem plate, so that said mounting section of said right handlebar overlaps at least a portion of said mounting section of said left handlebar.

15. The bicycle frame as claimed in claim 9, wherein said right handlebar includes a conduit for running a bicycle component cable, and said left handlebar includes a conduit for running a bicycle component cable, and said cables are configured to keep said right handlebar and said left handlebar attached to the bicycle when detached from the handlebar stem.

16. A split handlebar assembly for an aerodynamic bicycle, comprising:
- a right handlebar having a mounting section at one end; and
- a left handlebar having a mounting section at one end;
- wherein an overlapping section of the right handlebar mounting section is configured to overlap and engage with an overlapping section of the left handlebar mounting section to form a half lap splice joint.

17. The split handlebar assembly of claim 16, further comprising a stem plate, and wherein the mounting sections are further configured to secure the right handlebar and the left handlebar to the stem plate.

18. The split handlebar assembly of claim 17, wherein the right handlebar and the left handlebar are configurable in either a "bars down" or a "bars up" position, wherein the right handlebar and the left handlebar are both flipped over in the "bars up" position, relative to the "bars down" position.

19. The split handlebar assembly of claim 17, wherein the right handlebar includes a conduit for running a bicycle component cable, and the left handlebar includes a conduit for running a bicycle component cable, and the cables are configured to keep the right handlebar and the left handlebar attached to the bicycle when detached from the stem plate.

20. The split handlebar assembly of claim 16, wherein the mounting sections include mounting holes configured to receive mechanical fasteners that pass through the respective mounting holes of both mounting sections.

\* \* \* \* \*